United States Patent
Akita et al.

(10) Patent No.: US 9,571,704 B2
(45) Date of Patent: Feb. 14, 2017

(54) SIGNAL MULTIPLEXING APPARATUS AND TRANSMISSION APPARATUS

(71) Applicant: KABUSHIKI KAISHA TOSHIBA, Minato-ku, Tokyo (JP)

(72) Inventors: Koji Akita, Kanagawa (JP); Yukako Tsutsumi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/059,005

(22) Filed: Mar. 2, 2016

(65) Prior Publication Data
US 2016/0337556 A1    Nov. 17, 2016

(30) Foreign Application Priority Data
May 12, 2015   (JP) .................. 2015-097415

(51) Int. Cl.
   *H04N 5/04*     (2006.01)
   *H04N 5/268*    (2006.01)
   *H04N 5/067*    (2006.01)

(52) U.S. Cl.
   CPC ................... *H04N 5/0675* (2013.01)

(58) Field of Classification Search
   CPC .......... H04N 5/0675; H04N 5/04; H04N 5/06; H04N 5/268; H04N 7/08; H04N 7/12; H04L 7/0337; H04L 7/0008; H04Q 11/04; H04Q 11/0478
   USPC ......... 348/705, 706, 500; 370/357–360, 366, 370/367, 369, 391
   IPC ............................................. H04N 5/04, 5/268
   See application file for complete search history.

(56) References Cited

U.S. PATENT DOCUMENTS

| | | | |
|---|---|---|---|
| 6,427,197 B1* | 7/2002 | Sato | G11C 7/1039 365/189.15 |
| 2011/0285443 A1* | 11/2011 | Suzawa | G01R 31/31919 327/199 |
| 2012/0007755 A1 | 1/2012 | Kashiwakura | |
| 2015/0351057 A1 | 12/2015 | Akita et al. | |

FOREIGN PATENT DOCUMENTS

| | | |
|---|---|---|
| JP | 2011071666 A | 4/2011 |
| JP | 2012019252 A | 1/2012 |
| JP | 2015226214 A | 12/2015 |

OTHER PUBLICATIONS

Texas Instruments, DS92LV2421/DS92LV2422 10 to 75 MHz, 24-bit Channel Link II Serializer and Deserializer.

* cited by examiner

*Primary Examiner* — Sherrie Hsia
(74) *Attorney, Agent, or Firm* — Holtz, Holtz & Volek PC

(57) ABSTRACT

According to an embodiment a signal multiplexing apparatus includes a clock selector, a data selector, and a converter. The clock selector selects either a first clock signal synchronized with a first data signal or a second clock signal different from the first clock signal to obtain a third clock signal. The data selector selects a subset of a first signal set at each timing controlled by the third clock signal to generate a first parallel signal. The first signal set includes the first data signal and a second data signal whose speed is lower than a speed of the first data signal. The converter converts the first parallel signal into a serial signal in accordance with the third clock signal.

13 Claims, 6 Drawing Sheets

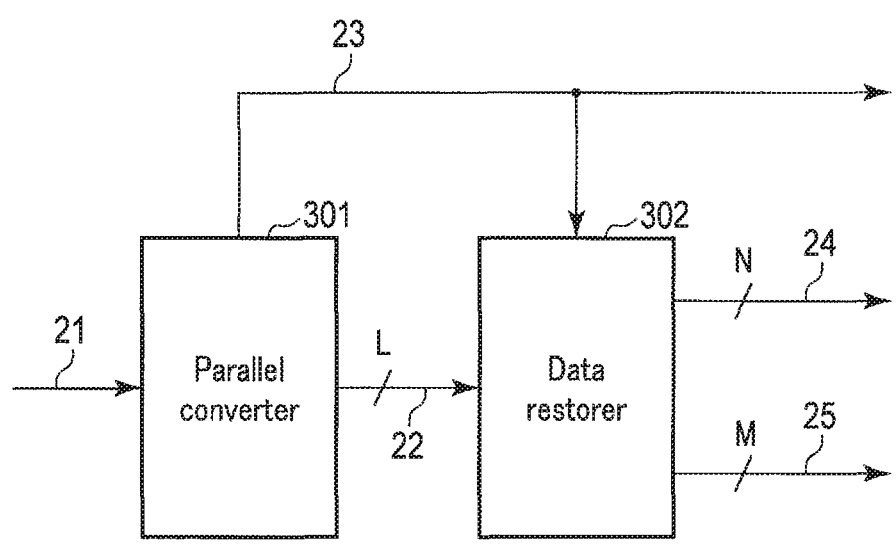
F I G. 3

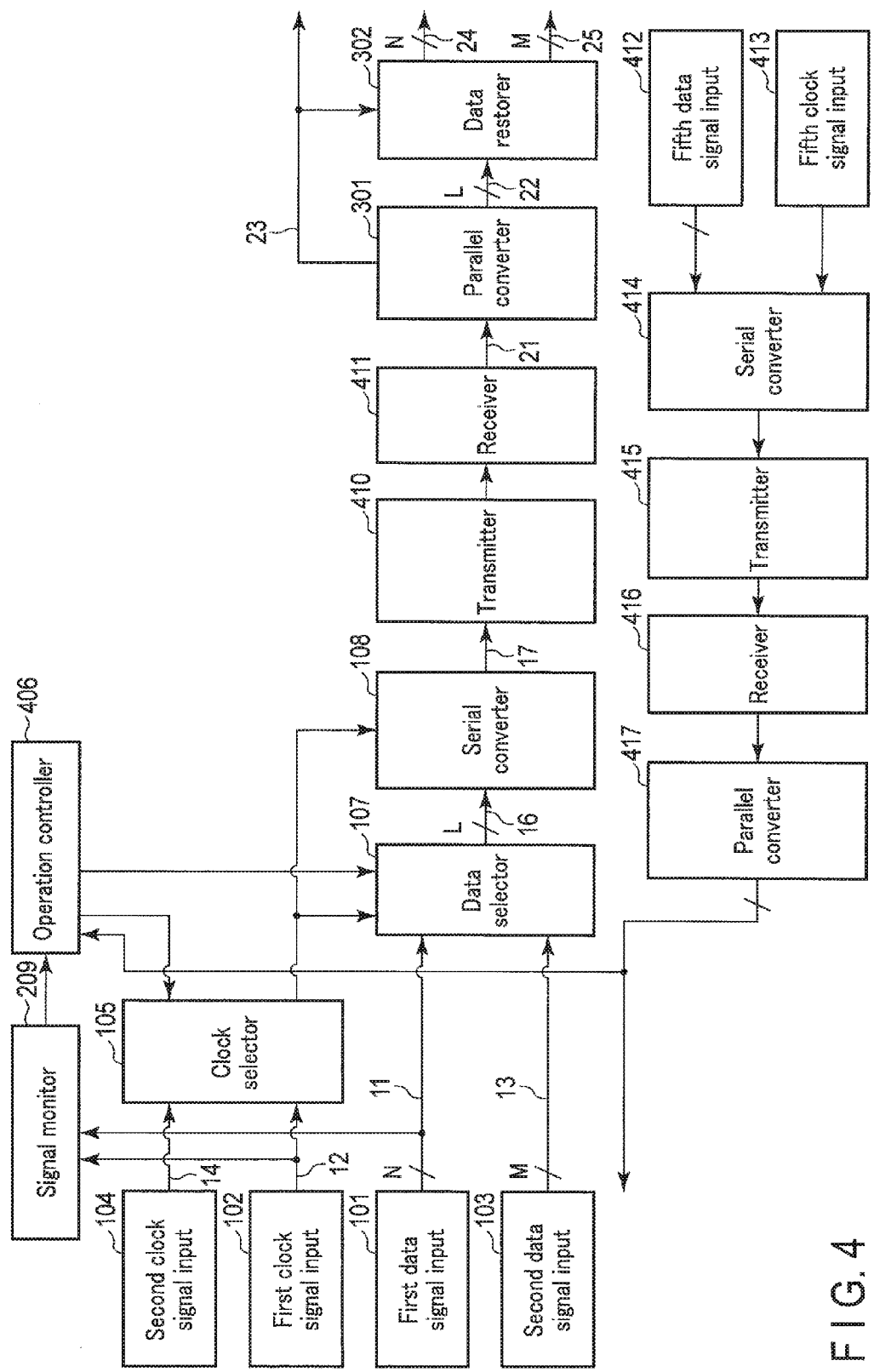
F I G. 4

SIGNAL MULTIPLEXING APPARATUS AND TRANSMISSION APPARATUS

CROSS-REFERENCE TO RELATED APPLICATIONS

This application is based upon and claims the benefit of priority from Japanese Patent Application No. 2015-097415, filed May 12, 2015, the entire contents of which are incorporated herein by reference.

FIELD

Embodiments described herein relate generally to signal multiplexing.

BACKGROUND

To multiplex a plurality of signals, for example, parallel/serial conversion or an apparatus called a serializer is used. The number of transmission lines necessary to transmit a serial signal can be one regardless of the total number of signals to be exchanged simultaneously.

For example, there is known a technique of generating a serial signal by multiplexing a video signal and a control signal using a clock signal synchronized with the video signal. According to this technique, it is possible to transmit the video signal and the control signal by one transmission line independently of the bit widths of these signals. However, according to this technique, multiplexing processing is controlled using the clock signal synchronized with the video signal. Thus, in a state in which, for example, the control signal is supplied but the video signal is not supplied, the clock signal may not be supplied either, and control signal transmission may be impossible.

BRIEF DESCRIPTION OF THE DRAWINGS

FIG. 3 is a block diagram showing a signal de-multiplexing apparatus corresponding to the signal multiplexing apparatus shown in FIG. 1;

FIG. 4 is a block diagram showing a transmission apparatus according to the third embodiment;

DETAILED DESCRIPTION

Figure 1:
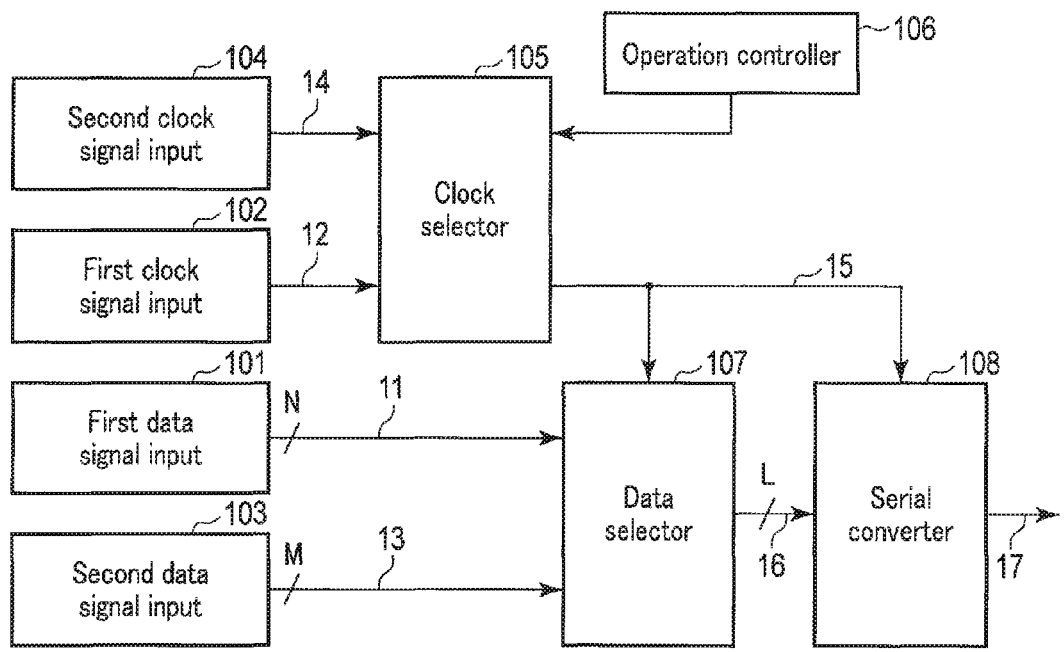
FIG. 1 is a block diagram showing a signal multiplexing apparatus according to the first embodiment.

The embodiments will now be described with reference to the accompanying drawings.

According to an embodiment a signal multiplexing apparatus includes a clock selector, a data selector, and a converter. The clock selector selects either a first clock signal synchronized with a first data signal or a second clock signal different from the first clock signal to obtain a third clock signal. The data selector selects a subset of a first signal set at each timing controlled by the third clock signal to generate a first parallel signal. The first signal set includes the first data signal and a second data signal whose speed is lower than a speed of the first data signal. The converter converts the first parallel signal into a serial signal in accordance with the third clock signal.

Note that the same or similar reference numerals denote elements that are the same as or similar to those already explained, and a repetitive description will basically be omitted.

In the following description, a single-phase signal is assumed to be used. If a differential signal is used in place of the single-phase signal, the number of transmission lines is doubled.

First Embodiment

As shown in FIG. 1, a signal multiplexing apparatus according to the first embodiment includes a first data signal input 101, a first clock signal input 102, a second data signal input 103, a second clock signal input 104, a clock selector 105, an operation controller 106, a data selector 107, and a serial converter 108. The signal multiplexing apparatus generates a serial signal 17 by multiplexing a first data signal 11 and a second data signal 13.

The first data signal input. 101 receives the first data signal 11 whose bit width is N (≥1). When N≥2, the first data signals 11 are assumed to be synchronized with each other. The first data signal input 101 may receive a video signal as the first data signal 11 from, for example, an external apparatus such as a camera (module), a processor, a display (module), or a controller (module). The first data signal input 101 outputs the first data signal 11 to the data selector 107.

In each embodiment, a state in which two signals are synchronized indicates a state in which the frequencies of the two signals significantly match, and the timings (phases) at which their signal values can change significantly match.

For example, if the frequencies of two data signals do not significantly match, the signals are not synchronized. If the frequencies of the two signals significantly match, but the timings at which their signal values can change are out of synchronization, the signals are not synchronized. In general, unless the two data signals are synchronized, it is not easy to do sampling so as to correctly restore the two data signals using a common clock signal.

Similarly, if the frequencies of a data signal and a clock signal do not match, the signals are not synchronized. If the frequencies of the two signals significantly match, but the timing at which the signal value of the data signal can change is out of synchronization with the timing at which the signal value of the clock signal can change (to be exact, one of the rising edge and the falling edge used to control the timing of data sampling), the signals are not synchronized.

In general, unless the data signal and the clock signal are synchronized, it is not easy to do sampling so as to correctly restore the data signal using the clock signal. On the other hand, if the data signal and the clock signal are synchronized, it is not difficult to do sampling so as to correctly restore the data signal using the clock signal. In addition, if two data signals and the clock signal are synchronized, it is not difficult to do sampling so as to correctly restore the two data signals using the clock signal.

The first clock signal input. 102 receives a first clock signal 12 synchronized with (each of) the first data signal(s) 11. The first clock signal input 102 may receive the first clock signal 12 from the above-described external apparatus. The first clock signal input 102 outputs the first clock signal 12 to the clock selector 105.

The second data signal input 103 receives the second data signal 13 whose bit width is M ($\geq 1$). The speed (data rate) of the second data signal 13 is lower than that of the first data signal 11. That is, the minimum value of the period at which the signal value of the second data signal 13 changes is larger than the minimum value of the period at which the signal value of the first data signal 11 changes. The second data signal input 103 may receive a control signal as the second data signal 13 from, for example, the above-described external apparatus. The second data signal input 103 outputs the second data signal 13 to the data selector 107.

The second clock signal input 104 receives a second clock signal 14 that is different from the first clock signal 12. For example, the first clock signal 12 and the second clock signal 14 may be generated independently by clock generators (crystal oscillators (ICs (Integrated Circuits)) or modules) different from each other. Alternatively, the first clock signal 12 and the second clock signal 14 may be generated by branching an original clock signal generated by a common clock generator and processing the clock signals via signal paths different from each other. The second clock signal 14 can either be in or out of synchronism with the first clock signal 12. For example, the second clock signal 14 may be different from the first clock signal 12 in the frequency or in the timing at which the signal value can change (to be exact, one of the rising edge and the falling edge used to control the timing of data sampling).

The second clock signal input 104 may receive the second clock signal 14 from, for example, the above-described external apparatus, another external apparatus, or a clock generator (not shown) provided in the signal multiplexing apparatus shown in FIG. 1. The second clock signal input 104 outputs the second clock signal 14 to the clock selector 105.

Alternatively, the second clock signal input 104 may be replaced with a second clock signal generator that generates the second clock signal 14. The second clock signal generator may include a clock generator that generates the second clock signal 14, or may receive a reference signal from outside of the second clock signal generator and generate the second clock signal 14 based on the reference signal.

The first data signal input 101, the first clock signal input 102, the second data signal input 103, and the second clock signal input 104 can be implemented using, for example, an interface such as a connector, a pin, or a pad.

The clock selector 105 receives the first clock signal 12 from the first clock signal input 102, the second clock signal 14 from the second clock signal input 104, and a clock control signal from the operation controller 106. The clock selector 105 selects either the first clock signal 12 or the second clock signal 14 indicated by the clock control signal, thereby obtaining a third clock signal 15. The clock selector 105 outputs the third clock signal 15 to the data selector 107 and the serial converter 108.

The clock selector 105 may be a switch implemented using, for example, an IC or programmable device (FPGA (Field Programmable Gate Array), PLD (Programmable Logic Device), or the like).

The operation controller 106 controls the operation of the clock selector 105. Specifically, the operation controller 106 determines which one of the first clock signal 12 and the second clock signal 14 should be selected by the clock selector 105, and generates a clock control signal that instructs to select the determined clock signal. For example, in a state in which the first clock signal 12 is not supplied, the operation controller 106 generates a clock control signal that instructs to select the second clock signal 14. According to the clock control signal, multiplexing processing can be continued by using the second clock signal 14, not only in a state in which the first clock signal 12 is supplied, but also in a state in which the supply of the first clock signal 12 has stopped. The operation controller 106 outputs the clock control signal to the clock selector 105.

Note that in the state in which the first clock signal 12 is supplied, the operation controller 106 can either determine to select the first clock signal 12, or determine to select the second clock signal 14. However, if it is necessary to correctly restore the first data signal 11 by the signal de-multiplexing apparatus (to be described later, though not shown in FIG. 1), multiplexing processing is preferably controlled using the first clock signal 12 synchronized with the first data signal 11.

The data selector 107 receives the first data signal 11 from the first data signal input 101, the second data signal 13 from the second data signal input 103, and the third clock signal 15 from the clock selector 105. At each timing controlled by the third clock signal 15 (for example, the rising edge or falling edge of the third clock signal 15), the data selector 107 selects L ($2 \leq L \leq N+M$) samples out of the first data signal 11 and the second data signal 13, thereby generating a parallel signal 16 having a bit width L. The data selector 107 outputs the parallel signal 16 to the serial converter 108.

If the data selector 107 selects, from the first data signal 11, P (P<L) bits out of the L bits of the parallel signal 16, the remaining (L−P) bits are selected from the second data signal 13 at maximum. The ratio of P to L (that is, the ratio of the first data signal 11 to the parallel signal 16) need not be fixed, and can be changed dynamically.

For example, the data selector 107 may be able to switch between a first operation mode and a second operation mode. In the second operation mode, the data selector 107 is assumed to operate to decrease the ratio of P to L, as compared to the first operation mode. Note that in the second operation, mode, P/L=0 may hold, that is, the first data signal 11 may not be selected at all.

In a state in which the first data signal 11 need not be transmitted, the data selector 107 can operate in the second operation mode to more efficiently transmit the second data signal 13, or the signal de-multiplexing apparatus (not shown in FIG. 1) can more correctly restore the second data signal 13.

Additionally, in a state in which part of the second data signal 13 need not be transmitted, the data selector 107 may decrease the ratio to select part of the second data signal 13 and increase the ratio to select the remaining part.

Figure 5:
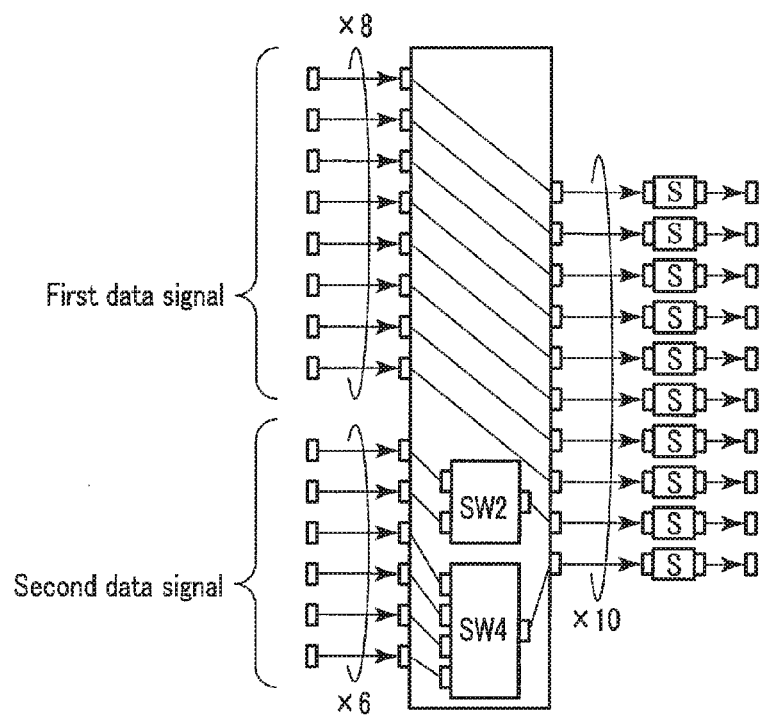
FIG. 5 is an explanatory view of the first operation mode of a data selector shown in FIG. 1.
Figure 6:
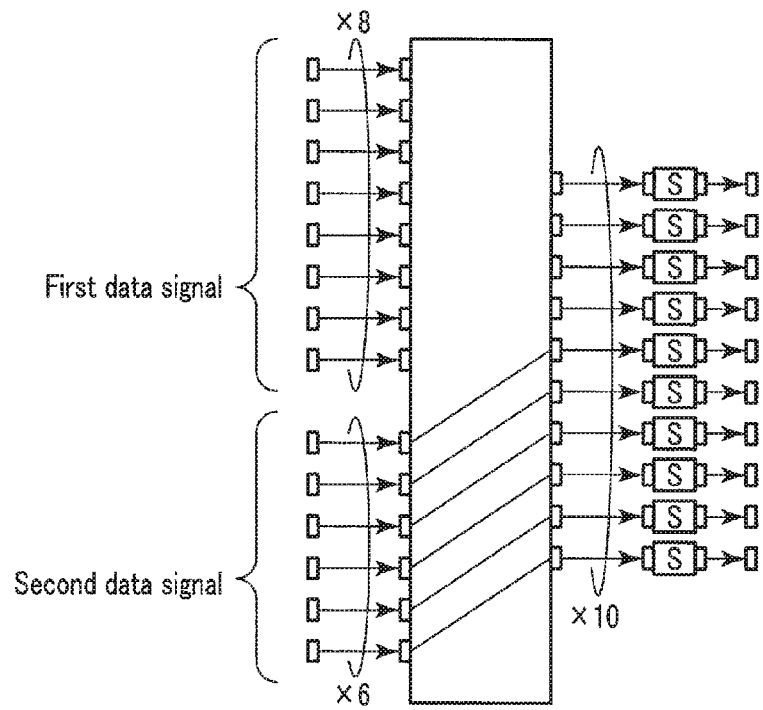
FIG. 6 is an explanatory view of the second operation mode of the data selector shown in FIG. 1.

In the first operation mode, the data selector 107 may operate as shown in FIG. 5. In the example shown in FIG. 5, L=10, and P=8. That is, the data selector 107 selects 8 bits out of 10 bits of the parallel signal 16 from the first data signal 11, and selects a remaining 2 bits from the second data signal 13. On the other hand, in the second operation mode, the data selector 107 may operate as shown in FIG. 6. In the example shown in FIG. 6, L=10, and P=0. That is, the data selector 107 selects 6 bit, out of 10 bits of the parallel signal 16 from the second data signal 13.

Note that in the examples shown in FIGS. 5 and 6, the bit width L of the parallel signal 16 is fixed independently of the operation mode of the data selector 107. However, the bit width may be changed depending on the operation mode of the data selector 107. If the bit width of the parallel signal 16 is decreased in accordance with the situation, it is possible to reduce power consumption concerning the serial signal 17 by reducing the speed while maintaining the transmission quality of the serial signal 17 (to be described later), or to improve the transmission quality without increasing the power consumption concerning the serial signal 17.

Figure 7:
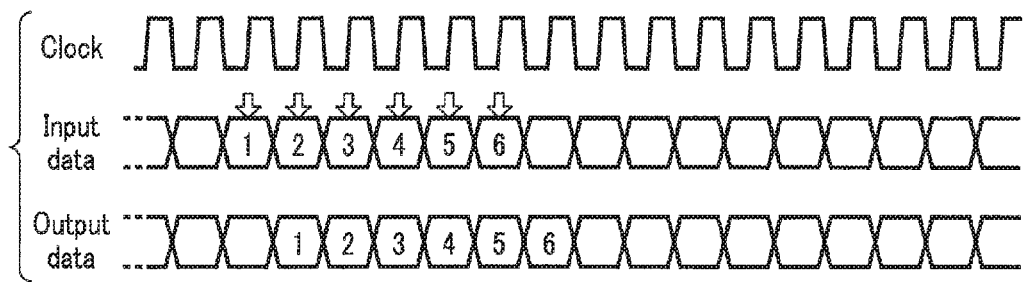
FIG. 7 is a view showing the relationship between a third clock signal, a first data signal, and a parallel signal in a case in which the data selector shown in FIG. 1 operates as shown in FIG. 5.

In the example shown in FIG. 5, 8 bits of the first data signal 11 are always selected and sampled at each timing controlled by the third clock signal 15. Note that a symbol S in FIG. 5 and FIG. 6 to be described later indicates a sampler. That is, as shown in FIG. 7, the data selector 107, for example, selects and samples each of the 8 bits of the first data signal 11 at each rising edge (indicated by an arrow) of the third clock signal 15, and outputs the sampling result as 1 bit of the parallel signal 16 in accordance with the next rising edge of the third clock signal 15. Thus, according to the example shown in FIG. 5, the 8 bits of the parallel signal 16 corresponding to the first data signal 11 are significantly equivalent to the first data signal 11 except that the bits are delayed by one clock with respect to the first data signal 11.

On the other hand, in FIG. 5, the 6 bits of the second data signal 13 are selected and sampled at a ratio of ½ to ¼ at each timing. In other words, 2 bits of the second data signal 13 are selected and sampled at a 2-clock period, and the remaining 4 bits are selected and sampled at a 4-clock period. Note that when selecting and sampling the 2 bits (or 4 bits) at the 2-clock (or 4-clock) period, the data selector 107 may select and sample these bits one by one in correspondence with each clock. Alternatively, the data selector 107 may sample the bits at once at a period of 2 clocks (or 4-clock) and select a sampling result for each clock, thereby outputting it as 1 bit of the parallel signal 16.

Figure 8:
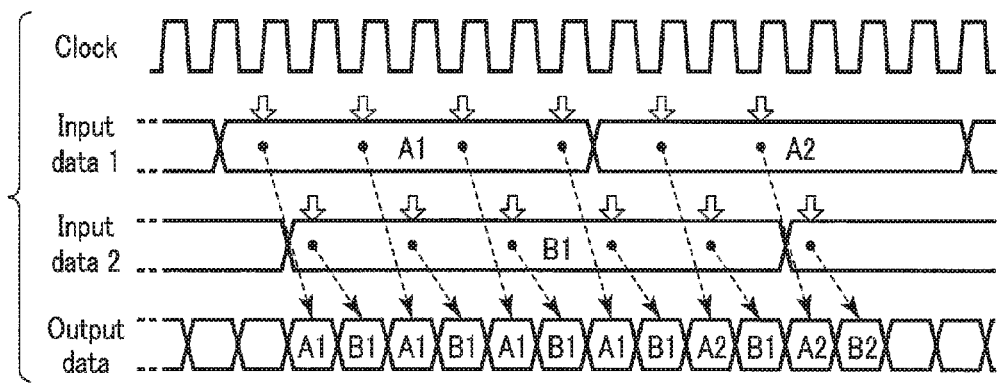
FIG. 8 is a view showing the relationship between third clock signal, a second data signal, and the parallel signal in a case in which the data selector shown in FIG. 1 operates as shown in FIG. 5.

Specifically, as shown in FIG. 8, the data selector 107 may, for example, alternately select and sample 2 bits (input data 1 and input data 2) of the second data signal 13 at each rising edge (indicated by an arrow) of the third clock signal 15 and output each sampling result as 1 bit of the parallel signal 16 in accordance with the next rising edge.

Figure 9:
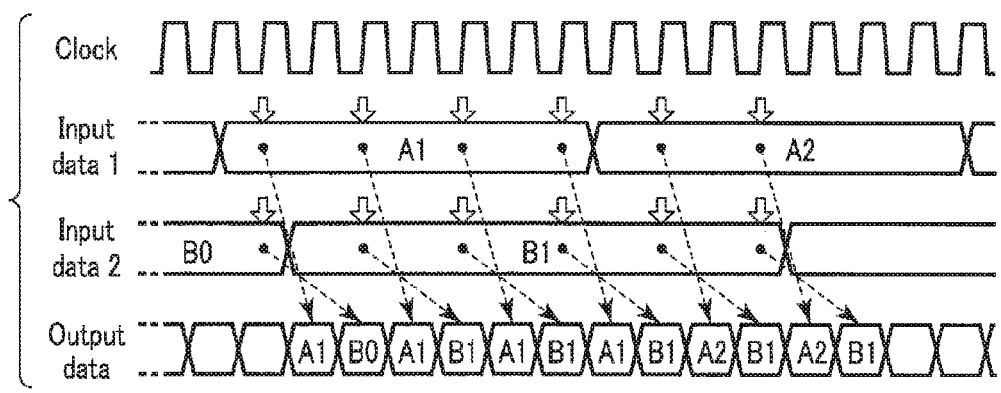
FIG. 9 is a view showing the relationship between the third clock signal, the second data signal, and the parallel signal in a case in which the data selector shown in FIG. 1 operates as shown in FIG. 5.

Alternatively, for example, as shown in FIG. 9, the data selector 107 may sample 2 bits (input data 1 and input data 2) of the second data signal 13 at once at every other rising edge (indicated by an arrow) of the third clock signal 15 and sequentially select and output the sampling results as 2 bits of the parallel signal 16 in accordance with the next rising edge and the rising edge after the next. Note that according to the operation example shown in FIG. 9, the sampling timings of the bits are the same. Thus, if M-bit signals of the second data signal 13 are synchronized with each other, the synchronization relationship can easily be maintained.

Figure 10:
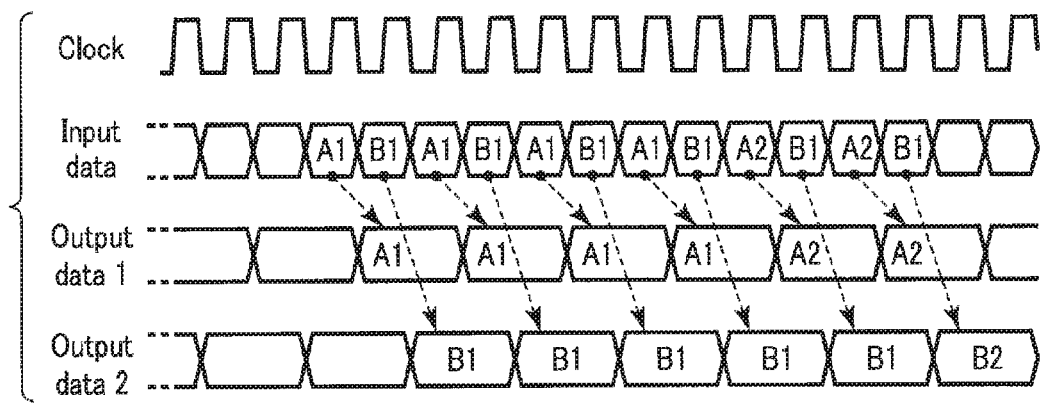
FIG. 10 is an explanatory view of a technique of restoring the second data signal from the parallel signal generated as shown in FIG. 8.
Figure 11:
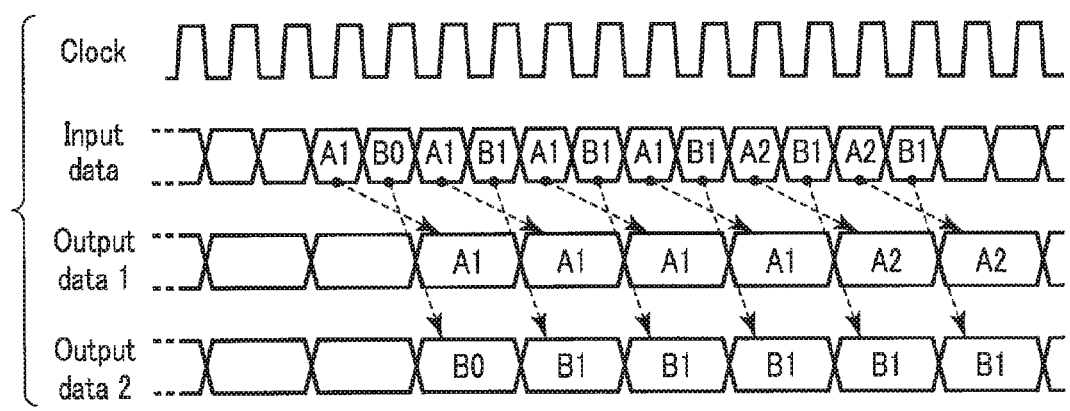
FIG. 11 is an explanatory view of a technique of restoring the second data signal from the parallel signal generated as shown in FIG. 9.

If 2 bits of the second data signal 13 are converted into a 1-bit signal as shown in FIG. 8, the signal de-multiplexing apparatus (not shown in FIG. 1) can restore the 2 bits by performing reverse processing to that in FIG. 8 as shown in FIG. 10. On the other hand, if 2 bits of the second data signal 13 are converted into a 1-bit signal as shown in FIG. 9, the signal de-multiplexing apparatus can restore the 2 bits by performing reverse processing to that in FIG. 9 as shown in FIG. 11.

Note that the signal de-multiplexing apparatus needs to detect the timing to start the reverse processing to that in FIG. 8 or 9 and operate in accordance with the timing. If the timing is incorrect, the restored bits may be mixed up (for example, output data 1 and output data 2 shown in FIG. 10 or 11 may change places). Information representing the timing may be notified to the signal de-multiplexing apparatus using a signal independent of the serial signal 17, or embedded in the serial signal 17.

The serial converter 106 receives the third clock signal 15 from the clock selector 105 and receives the parallel signal 16 from the data selector 107. The serial converter 108 selects one sample out of the parallel signal 16 at each timing controlled by the third clock signal 15, thereby generating the serial signal 17. Note that a synchronization signal may be inserted into the serial signal 17 for synchronization control in the signal de-multiplexing apparatus, although not described here. Thus, the timing is not necessarily in a one-to-one correspondence with the rising edge or falling edge of the third clock signal 15. In other words, each sample of the parallel signal 16 may be selected at a period L2 (>L) times longer than the period of the third clock signal 15. The serial converter 108 outputs the serial signal 17 to, for example, a transmitter (not shown.).

The operation controller 106, the data selector 107, and the serial converter 108 can be implemented using, for example, an IC, a programmable device, or a CPU (Central Processing Unit).

Note that the serial signal 17 may be transmitted by wire or wirelessly. For example, the signal multiplexing apparatus shown in FIG. 1 can further include a transmitter configured to wirelessly transmit the serial signal 17. The transmitter may modulate a bit value of the serial signal 17 into a radio signal using an amplitude modulation method such as on-off-keying that expresses a bit value as on/off of a radio signal.

FIG. 3 shows a signal de-multiplexing apparatus corresponding to the signal multiplexing apparatus shown in FIG. 1. The signal de-multiplexing apparatus shown in FIG. 3 includes a parallel converter 301 and a data restorer 302. The signal de-multiplexing apparatus de-multiplexes a serial signal 21, thereby generating a third data signal 24 and a fourth data signal 25.

Note that the serial signal 21 may be transmitted by wire or wirelessly. For example, the signal de-multiplexing apparatus shown in FIG. 3 can further include a receiver configured to wirelessly receive the serial signal 21. The receiver may demodulate a bit value from a radio signal using a demodulation method corresponding to an amplitude modulation method such as on-off-keying.

The parallel converter 301 receives the serial signal 21. The serial signal 21 corresponds to the above-described serial signal 17. The parallel converter 301 generates a fourth clock signal 23 synchronized with the serial signal 21. Note that the frequency of the fourth clock signal can change, like the frequency of the above-described third clock signal 15. The parallel converter 301 further samples the serial signal 21 at each timing controlled by the fourth clock signal 23 and selects a bit as a sample of a parallel signal 22 having the bit width L, thereby generating the parallel signal 22. Note that each sample of the serial signal 21 may be selected as a sample of the parallel signal 22 at a period L2 (>L) times longer than the period of the fourth clock signal 23, as described above. The parallel converter 301 outputs the parallel signal 22 and the fourth clock signal 23 to the data restorer 302.

The data restorer 302 receives the parallel signal 22 and the fourth clock signal 23 from the parallel converter 301. The data restorer 302 selects and outputs L bits of the parallel signal 22 as L samples of one of the third data signal 24 having the bit width N and the fourth data signal 25 having the bit width M at each timing controlled by the fourth clock signal 23. The third data signal 24 and the fourth data signal 25 correspond to the restored signal of the above-described first data signal 11 and the restored signal of the second data signal 13, respectively.

Since the first data signal 11 is synchronized with the first clock signal 12, the first data signal 11 sampled using the first clock signal 12 can correctly be restored in the third data signal 24. On the other hand, the second data signal 13 is not necessarily correctly restored in the fourth data signal 25.

Note that in general, when a data signal is sampled using a clock signal that is not synchronized with the data signal, the restored signal of the sampled signal does not always match the original data signal. The difference between them tends to be small as the ratio of the frequency of the clock signal with respect to the frequency of the data signal becomes high. For this reason, the higher the frequency of the clock signal is, the more accurately the data signal can be transmitted.

For example, in a case in which the frequency of the clock signal is 10 times higher than the frequency of the data signal, even if the sampling period of the data signal is 2 clocks, the data signal is sampled at a speed five times higher than the speed of the data signal. Similarly, in a case in which the frequency of the clock signal is 20 times higher than the frequency of the data signal, even if the sampling period of the data signal is 4 clocks, the data signal is sampled at a speed five times higher than the speed of the data signal. That is, the data signal is sampled five times after the signal value has changed to the current value until it changes to the next value.

As described above, the signal multiplexing apparatus according to the first embodiment controls multiplexing processing by selecting either the first clock signal or the second clock signal. Thus, according to the signal multiplexing apparatus, for example, in a state in which the first clock signal is not supplied, out of the first data signal and the second data signal, at least the second data signal can stably be transmitted.

Note that even if the operation mode of the data selector 107 is fixed, power consumption concerning the serial signal 17 can be reduced by using the second clock signal 14 whose frequency is lower than that of the first clock signal 12. If the frequency of the second clock signal 14 is low, the third clock signal 15 having a low frequency can be supplied to the data selector 107 and the serial converter 108, for example, in a state in which the first data signal 11 need not be transmitted, and therefore, the operation speeds of the data selector 107 and the serial converter 108 decreases. However, it should be noted that not only the transmission quality of the first data signal 11, but also that of the second data signal 13 degrades.

Second Embodiment

Figure 2:
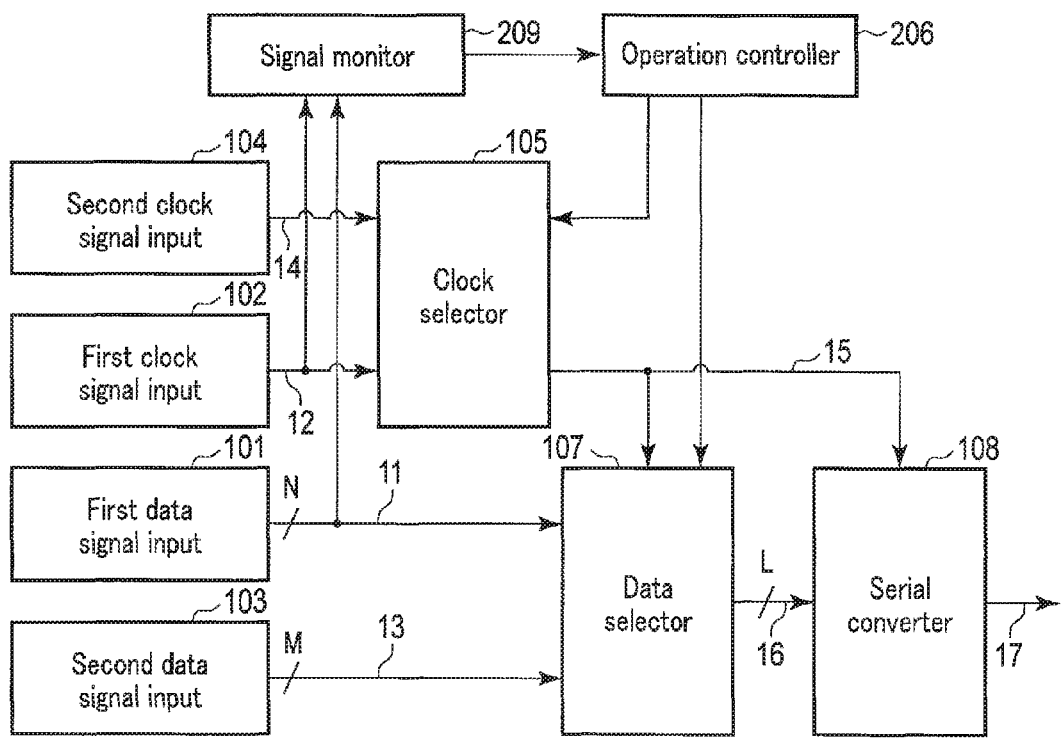
FIG. 2 is a block diagram showing a signal multiplexing apparatus according to the second embodiment.

As shown in FIG. 2, a signal multiplexing apparatus according to the second embodiment includes a first data signal input 101, a first clock signal input 102, a second data signal input 103, a second clock signal input 104, a clock selector 105, an operation controller 206, a data selector 107, a serial converter 108, and a signal monitor 209. The signal multiplexing apparatus shown in FIG. 2 generates a serial signal 17 by multiplexing a first data signal 11 and a second data signal 13, like the signal multiplexing apparatus shown in FIG. 1.

The operation controller 206 is notified, by the signal monitor 209, of the monitoring result of the input state of the first data signal 11 or a first clock signal 12. The operation controller 206 controls the operations of the clock selector 105 and the data selector 107 based on the monitoring result. Specifically, upon receiving a monitoring result representing that the first data signal 11 or first clock signal 12 is not input (including a state in which noise is only input), the operation controller 206 generates a clock control signal that instructs to select a second clock signal 14. In addition, the operation controller 206 may set the data selector 107 in the above-described, second operation mode in accordance with the monitoring result.

For example, in a state in which the first data signal 11 is not input, it can be estimated that the first data signal 11 need not be transmitted. In this state, the operation controller 206 sets the data selector 107 in the above-described second operation mode. According to this operation, the second data signal 13 can efficiently be transmitted. Also in this state, although both the first clock signal 12 and the second clock signal 14 may be usable, the operation controller 206 causes the clock selector 105 to select the second clock signal 14. According to this operation, transmission of the second data signal 13 can be continued even if the first clock signal 12 has abruptly stopped. Furthermore, if the frequency of the second clock signal 14 is lower than that of the first clock signal 12, power consumption concerning the serial signal 17 can be reduced.

In a state in which the first clock signal 12 is not input, the first clock signal 12 cannot be used. In this state, the operation controller 206 causes the clock selector 105 to select the second clock signal 14. According to this operation, transmission of the second data signal 13 can be continued even during the period in which the first clock signal 12 is not supplied.

On the other hand, upon receiving a monitoring result representing that the first data signal 11 and the first clock signal 12 are input, the operation controller 206 may generate a clock control signal that instructs to select the first clock signal 12. In addition, the operation controller 200 may set the data selector 107 in the above-described first operation mode in accordance with the monitoring result.

The signal monitor 209 monitors the input state of at least one of the first data signal 11 and the first clock signal 12. The signal monitor 209 notifies the operation controller 206 of the monitoring result.

The frequency of the second clock signal 14 is preferably lower than the frequency of the first clock signal 12. The lower the frequency of the second clock signal 14 is, the lower the speed of the serial signal 17 is in a case in which the clock selector 105 selects the second clock signal 14. That is, power consumption concerning the serial signal 17 can be reduced, and on the other hand, the amount of data that can be carried by the serial signal 17 decreases. However, if the above-described second operation mode is used in a case in which the second clock signal 14 is selected, the second data signal 13 can be transmitted at an accuracy substantially equal to that in a case in which the first clock signal 12 is selected, and the data selector 107 is set in the first operation mode.

As described above, the second operation mode is designed so as to raise the ratio of selection of the second data signal 13 as compared to the first operation mode. For example, assume that all of M bits of the second data signal 13 are selected at a 1-clock period in the second operation mode. In this case, a signal that is selected at a 2-clock period or 4-clock period in the first operation mode is selected at a frequency about two or four times higher in the second operation mode. Thus, even if the frequency of the second clock signal 14 is about ½ the frequency of the first clock signal 12, the second data signal 13 can be transmitted at an accuracy substantially equal to that in a case in which the first clock signal 12 elected, and the data selector 107 is set in the first operation mode.

As described above, the signal multiplexing apparatus according to the second embodiment monitors the input state of the first data signal or first clock signal and switches the clock control signal in accordance with the monitoring result. Thus, according to the signal multiplexing apparatus, in a case in which the first data signal or first clock signal is not input, multiplexing processing can be continued using the second clock signal.

Additionally, the signal multiplexing apparatus according to the second embodiment may monitor the input state of the first data signal or first clock signal and switch the operation mode of the data selector in accordance with the monitoring result. Thus, according to the signal multiplexing apparatus, in a case in which the first data signal need not be transmitted, the second data signal can efficiently be transmitted. In addition, the frequency of the second clock signal can be lower than that of the first clock signal. Even if the second clock signal is selected, power consumption can be reduced while correctly transmitting the second data signal if the data selector operates in the second operation mode.

Third Embodiment

A transmission apparatus according to the third embodiment can include a signal multiplexing apparatus according to the above-described first or second embodiment, a transmitter that transmits a serial signal generated by the signal multiplexing apparatus, a receiver that receives the serial signal transmitted by the transmitter, and a signal de-multiplexing apparatus that de-multiplexes the serial signal received by the receiver. The transmission apparatus can perform either one-directional transmission from a first section connected to the signal multiplexing apparatus to a second section connected to the signal de-multiplexing apparatus, or bi-directional transmission between the first section and the second section.

As shown in FIG. 4, the transmission apparatus according to this embodiment includes a first data signal input 101, a first clock signal input 102, a second data signal input 103, a second clock signal input 104, a clock selector 105, an operation controller 406, a data selector 107, a serial converter 108, a signal monitor 209, a transmitter 410, a receiver 411, a parallel converter 301, a data restorer 302, a fifth data signal input 412, a fifth clock signal input 413, a serial converter 414, a transmitter 415, a receiver 416, and a parallel converter 417.

The transmission apparatus shown in FIG. 4 may include the first section and the second section. The first section may be, for example, a camera module or processor that outputs a first data signal 11 and a second data signal 13 corresponding to a video signal and a control signal. The second section may be a display module or control module that receives a third data signal 24 and a fourth data signal 25 corresponding to a restored video signal and control signal.

The first section outputs the first data signal 11, a first clock signal 12, and the second data signal 13 to the first data signal input 101, the first clock signal input 102, and the second data signal input 103, respectively. The first section may also output a second clock signal 14 to the second clock signal input 104. The first section may receive a sixth data signal (to be described later) from the parallel converter 417.

The second section receives the third data signal 24 and the fourth data signal 25 from the data restorer 302. The second section also outputs a fifth data signal and a fifth clock signal (to be described later) to the fifth data signal input 412 and the fifth clock signal input 413, respectively.

The operation controller 406 is notified, by the signal monitor 209, of the monitoring result of the input state of the first data signal 11 or first clock signal 12, and receives the sixth data signal from the parallel converter 417. The sixth data signal can include an external control signal for the clock selector 105 or data selector 107. The operation controller 406 controls the operations of the clock selector 105 and the data selector 107 based on the monitoring result, or in accordance with the sixth data signal. Note that if the operation controller 406 does not use the monitoring result, the signal monitor 209 can be omitted.

The transmitter 410 transmits a serial signal 17 by wire or wirelessly. For example, the transmitter 410 may transmit the serial signal 17 via a cable or a line on a circuit board, or may modulate the serial signal 17 into a radio signal and transmit it. The transmitter 410 (and transmitter 415 to be described later) can use an amplitude modulation method (for example, on-off-keying) for expressing a bit value of the serial signal as the amplitude of a radio signal, a frequency modulation method for expressing a bit value of the serial signal as the frequency of a radio signal, or the like.

Note that in a case in which the transmitter 410 performs wireless transmission, it is effective to switch the operation mode of the transmitter 410 (and the receiver 411) in accordance with selection of a third clock signal 15 by the clock selector 105 and the operation mode of the data selector 107. For example, the transmitter 410 may be able to operate in a first operation mode and a second operation mode in which power consumption is low as compared to the first operation mode.

Specifically, when the clock selector 105 selects the first clock signal 12, and the data selector 107 is set in the first operation mode, the transmitter 410 is set in the first operation mode. On the other hand, when the clock selector 105 selects the second clock signal 14, and the data selector 107 is set in the second operation mode, the transmitter 410 is set in the second operation mode.

If the frequency of the second clock signal 14 is lower than that of the first clock signal 12, the transmitter 410 is set in the second operation mode under the above-described condition. This makes it possible to transmit the serial signal 17 with sufficient accuracy while suppressing the power consumption of the transmitter 410 to a level appropriate to the speed of the serial signal 17 (the speed is lower than the speed of the serial signal 17 in a case in which the clock selector 105 selects the first clock signal 12) On the other hand, even in the case where the frequency of the second clock signal 14 is not lower than that of the first clock signal 12 (for example, the frequencies are equal), the ratio of selection of the second data signal 13 rises as compared to a case in which the data selector 107 operates in the first operation mode. Thus, when the transmitter 410 is set in the second operation mode under the above-described condition, the serial signal 17 (second data signal 13) can be transmitted at sufficient accuracy while suppressing the power consumption of the transmitter 410.

The receiver 411 receives a serial signal 21 transmitted by wire or wirelessly. For example, the receiver 411 may receive the serial signal 21 via a cable or a line on a circuit hoard, or may demodulate the received radio signal into a serial signal. The receiver 411 (and receiver 416 to be described later) can use a demodulation method corresponding to an amplitude modulation method (for example, on-off-keying), a frequency modulation method, or the like. The receiver 411 outputs the serial signal 21 to the parallel converter 301.

The fifth data signal input 412 receives parallel fifth data signals from the second section. The fifth data signals are typically synchronized with each other. The fifth data signal input 412 outputs the fifth data signals to the serial converter 414.

The fifth clock signal input 413 receives a fifth clock signal from the second section. The fifth clock signal is typically synchronized with each of the fifth data signals. The fifth clock signal input 413 outputs the fifth clock signal to the serial converter 414.

The serial converter 414 receives the fifth data signal from the fifth data signal input 412 and receives the fifth clock signal from the fifth clock signal input 413. The serial converter 414 selects one sample of the fifth data signals at each timing controlled by the fifth clock signal, thereby generating a serial signal. The serial converter 414 outputs the serial signal to the transmit 415.

The transmitter 415 receives the serial signal from the serial converter 414 and transmits the serial signal by wire or wirelessly. The receiver 416 receives the serial signal transmitted by the transmitter 415 by wire or wirelessly. The receiver 416 outputs the received serial signal to the parallel converter 417.

The parallel converter 417 receives the serial signal from the receiver 416. The parallel converter 417 generates a sixth clock signal (not shown) synchronized with the serial signal. Note that the frequency of the sixth clock signal is the same as the frequency of the fifth clock signal. In addition, the parallel converter 417 samples the serial signal at each timing controlled by the sixth clock signal and selects the bit as a sample of one of parallel sixth data signals, thereby generating the sixth data signal. The parallel converter 417 outputs at least part of the sixth data signal to the operation controller 406. The parallel converter 417 may also output at least part of the sixth data signal to the first section.

As described above, the transmission apparatus according to the third embodiment uses the signal multiplexing apparatus according to the above-described first or second embodiment for one-directional or bi-directional transmission in the transmission apparatus. Therefore, according to the transmission apparatus even in a state in which, for example, the first clock signal is not supplied, out of the first data signal and the second data signal, at least the second data signal can be stably transmitted. In addition, the transmission apparatus can transmit an external control signal for the clock selector and the data selector included in the signal multiplexing apparatus connected to the first section from the second section to the first section.

Note that the signal multiplexing apparatus and the signal de-multiplexing apparatus involved in transmission from the second section to the first section may be replaced with the signal multiplexing apparatus according to the first or second embodiment and the corresponding signal de-multiplexing apparatus, respectively.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A signal multiplexing apparatus comprising:
a clock selector that selects either a first clock signal synchronized with a first data signal or a second clock signal different from the first clock signal to obtain a third clock signal;
a data selector that selects a subset of a first signal set at each timing controlled by the third clock signal to generate a first parallel signal, the first signal set including the first data signal and a second data signal whose speed is lower than a speed of the first data signal; and
a converter that converts the first parallel signal into a serial signal in accordance with the third clock signal.

2. The apparatus according to claim 1, further comprising:
a first input that receives the first data signal;
a second input that receives the first clock signal;
a third input that receives the second data signal; and
a fourth input that receives the second clock signal.

3. The apparatus according to claim 1, wherein the data selector operates in a first operation mode and a second operation mode, and
a ratio to select the second data signal in a case in which the data selector operates the second operation mode is higher than a ratio to select the second data signal in a case in which the data selector operates in the first operation mode.

4. The apparatus according to claim 3, further comprising an operation controller that controls operations of the clock selector and the data selector,
wherein when causing the clock selector to select the first clock signal, the operation controller sets the data selector in the first operation mode, and when causing the clock selector to select the second clock signal, the operation controller sets the data selector in the second operation mode.

5. The apparatus according to claim 4, further comprising a signal monitor that monitors an input state of the first clock signal,
wherein in a case in which the first clock signal is not received, the operation controller causes the clock selector to select the second clock signal.

6. The apparatus according to claim 4, further comprising a signal monitor that monitors an input state of the first data signal,
wherein in a case in which the first data signal is not received, the operation controller causes the clock selector to select the second clock signal.

7. The apparatus according to claim 1, wherein a frequency of the second clock signal is lower than a frequency of the first clock signal.

8. A transmission apparatus comprising:
the signal multiplexing apparatus according to claim 1; and
a transmitter that transmits the serial signal.

9. The apparatus according to claim 8, wherein the transmitter wirelessly transmits the serial signal.

10. The apparatus according to claim 8, further comprising:
a receiver that receives the serial signal;
a parallel converter that generates a fourth clock signal synchronized with the serial signal based on the serial signal received by the receiver and converts the serial signal into a second parallel signal in response to the fourth clock signal; and
a data restorer that selects the second parallel signal as a sample of a subset of a second signal set at each timing controlled by the fourth clock signal and restores the first data signal and the second data signal, the second signal set including a third data signal and a fourth data signal.

11. The apparatus according to claim 10, wherein the transmitter wirelessly transmits the serial signal, and
the receiver wirelessly receives the serial signal.

12. A signal multiplexing method comprising:
selecting either a first clock signal synchronized with a first data signal or a second clock signal different from the first clock signal to obtain a third clock signal;
selecting a subset of a first signal set at each timing controlled by the third clock signal to generate a parallel signal, the first signal set including the first data signal and a second data signal whose speed is lower than a speed of the first data signal; and
converting the parallel signal into a serial signal in accordance with the third clock signal.

13. A transmission method comprising:
selecting either a first clock signal synchronized with a first data signal or a second clock signal different from the first clock signal to obtain a third clock signal;
selecting a subset of a first signal set at each timing controlled by the third clock signal to generate a first parallel signal, the first signal set including the first data signal and a second data signal whose speed is lower than a speed of the first data signal;
converting the first parallel signal into a serial signal in accordance with the third clock signal;
transmitting the serial signal;
receiving the serial signal;
generating a fourth clock signal synchronized with the serial signal based on the serial signal received by the receiver and converting the serial signal into a second parallel signal in response to the fourth clock signal; and
selecting the second parallel signal as a sample of a subset of a second signal set at each timing controlled by the fourth clock signal and restoring the first data signal and the second data signal, the second signal set including a third data signal and a fourth data signal.

* * * * *